March 23, 1965 D. S. SANBORN 3,174,397
DEPLOYMENT MECHANISM FOR SATELLITE MIRROR STRUCTURE
Filed Sept. 10, 1962 3 Sheets-Sheet 1
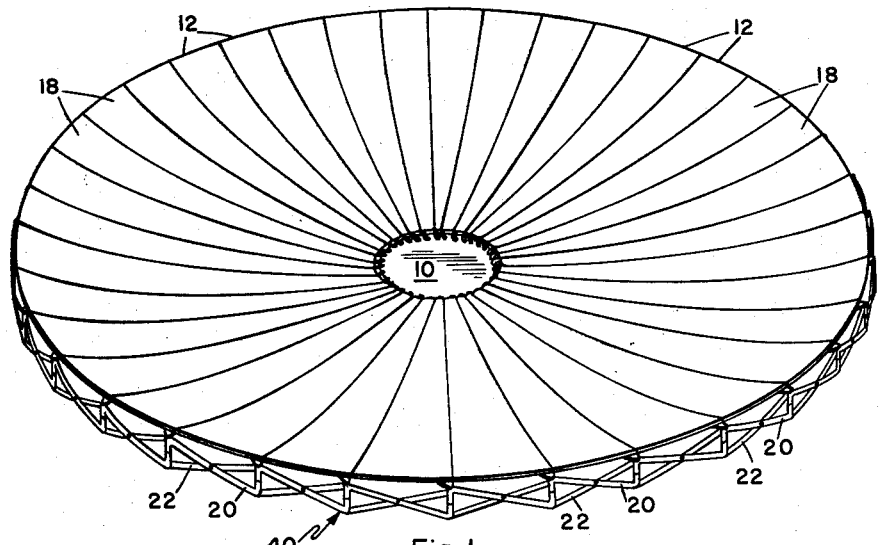
Fig. 1
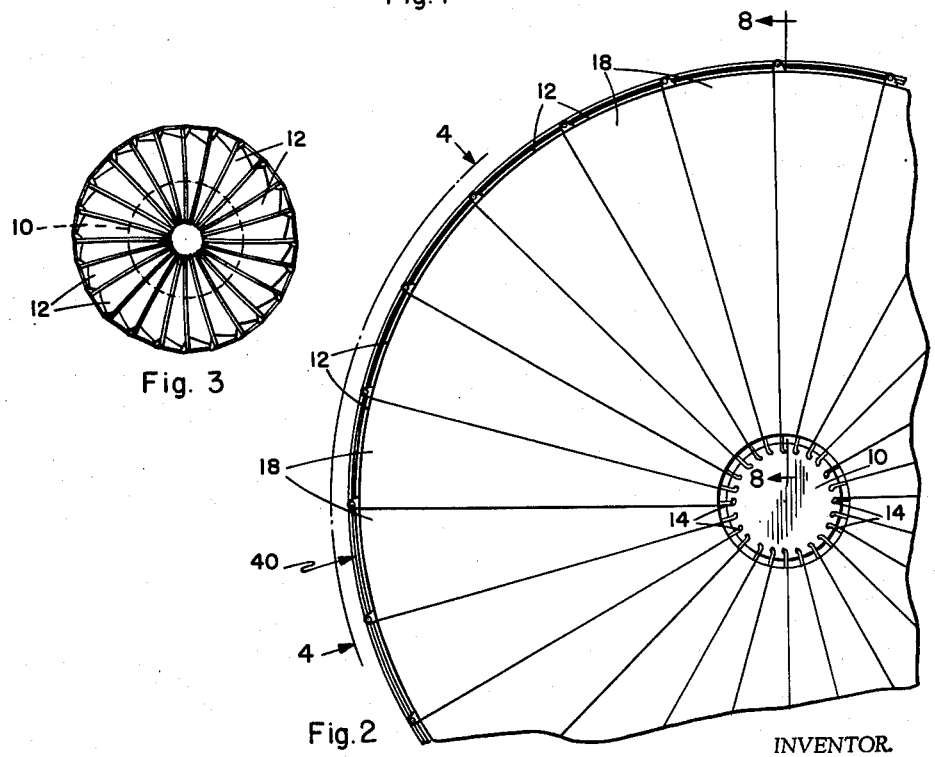
Fig. 3
Fig. 2
INVENTOR.
DANIEL S. SANBORN
BY
Knox & Knox March 23, 1965   D. S. SANBORN   3,174,397
DEPLOYMENT MECHANISM FOR SATELLITE MIRROR STRUCTURE
Filed Sept. 10, 1962   3 Sheets-Sheet 2

INVENTOR.
DANIEL S. SANBORN
BY
Knox & Knox

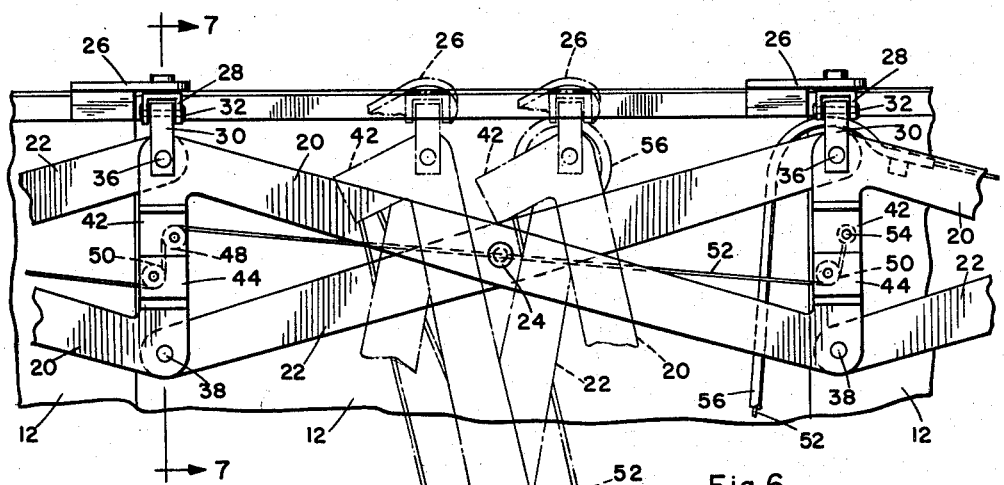
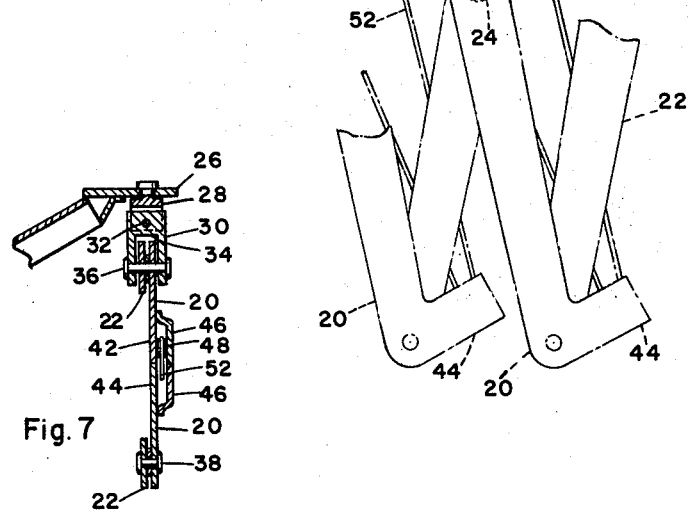
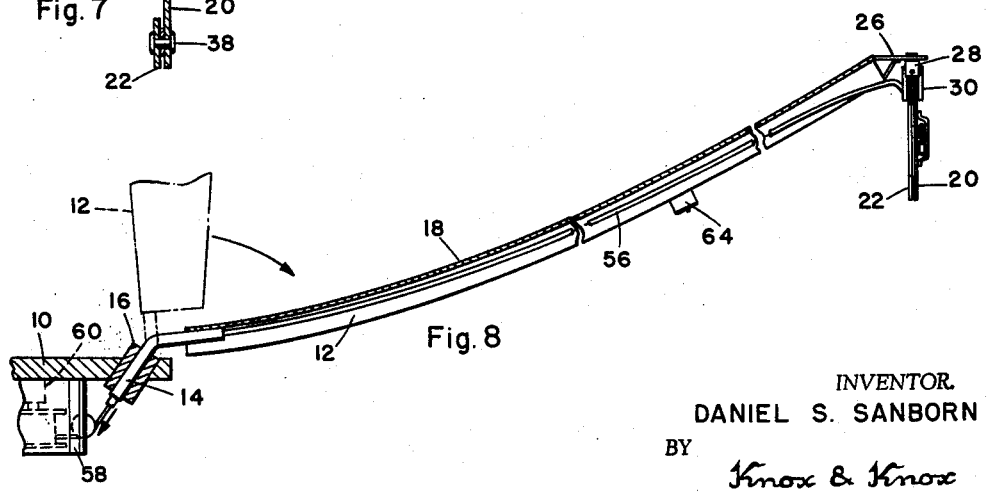

United States Patent Office 3,174,397
Patented Mar. 23, 1965

3,174,397
DEPLOYMENT MECHANISM FOR SATELLITE
MIRROR STRUCTURE
Daniel S. Sanborn, San Diego, Calif., assignor to The
Ryan Aeronautical Co., San Diego, Calif.
Filed Sept. 10, 1962, Ser. No. 222,606
8 Claims. (Cl. 88—73)

The present invention relates generally to erecting mechanisms and more particularly to deploying mechanism for a satellite mirror structure.

Power supplies for space vehicles are a major problem, since loads which can be lifted into orbit or on extended trips in space are limited by the power of available boosters. Solar energy is a readily available source of power and has been utilized by photoelectric devices, but the power output is low for the surface area required. Large reflectors which concentrate solar energy on a small thermoelectric unit are very effective and the most efficient form for such a reflector is a dished structure with a parabolic mirror surface. The mirror must be of considerable size and must therefore be collapsed in some manner into a compact package for injection into space. Once in position the mirror must be deployed into its fully extended operating position automatically and accurately.

The primary object of this invention, therefore, is to provide a mechanism for deploying a large mirror from a folded position to a fully open position automatically and maintaining accurate shape.

Another object of this invention is to provide a mechanism which is adaptable to a mirror composed of a plurality of hinged blades which move from a generally parallel folded position to an extended dish configuration, the mechanism being connected to each blade and operating to extend the blades smoothly and continuously.

Another object of this invention is to provide a mechanism incorporating integral stops which ensure accurate alignment of the extended blades.

A further object of this invention is to provide a mechanism of the aforementioned character which is simple, compact, light in weight and readily adaptable to space vehicle structural requirement.

With these and other objects defiinitely in view, this invention consists in the novel constructions, combination and arrangement of elements and portions as will be hereinafter fully described in the specification, particularly pointed out in the claims, and illustrated in the drawings which form a material part of this disclosure, and in which:

FIGURE 1 is a perspective view of the fully extended mirror;

FIGURE 2 is a partial top plan view of the extended mirror;

FIGURE 3 is a top plan view of the mirror in folded position;

FIGURE 6 is a further enlarged view similar to a portion of FIGURE 4, showing the deployment mechanism action;

FIGURE 7 is a sectional view taken on line 7—7 of FIGURE 6; and

FIGURE 8 is an enlarged sectional view taken on line 8—8 of FIGURE 2.

Similar characters of reference indicate similar or identical elements and portions throughout the specification and throughout the views of the drawing.

*Mirror structure*

Figure 4:
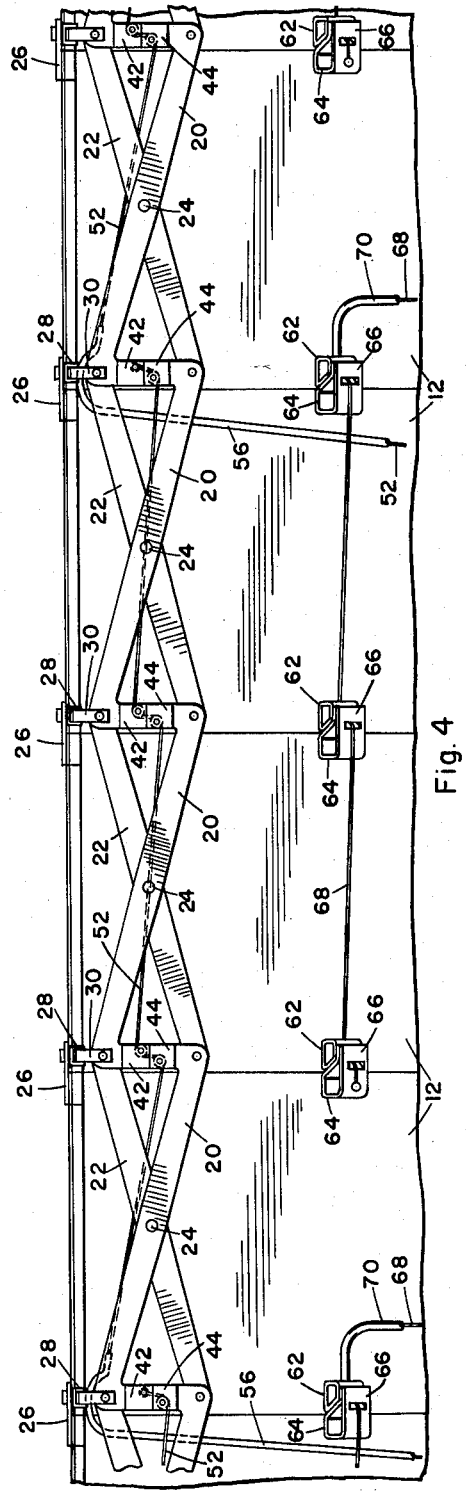
FIGURE 4 is an enlarged view taken in the direction of arrows 4—4 in FIGURE 2.

The mirror comprises a central base 10, illustrated as a flat disc, on which are mounted radial blades 12, each blade having a hinge 14 which fits into a socket member 16 in the base, as in FIGURE 8. The blades 12 are peripherally spaced around base 10 and each is a tapered segment of a parabolic dish structure with the narrow end at the hinge pin 14. In open position the blades combine to form a complete parabolic dish with their reflective faces 18 in an unbroken parabolic reflector. The socket members 16 are angularly disposed in base 10 and hinge pins 14 are offset, so that the blades 12 swing between the substantially flat portion when extended and a folded position as in FIGURE 3. In this folded position the blades lie substantially parallel to a common axis perpendicular to base 10, with the reflective faces 18 generally radial to the axis, this configuration being very compact and suitable for enclosure in a cylindrical nose cone or similar fairing. The precise geometry of the blade hinges will depend on the number of blades, the range of movement desired, the specific parabolic form and other factors. The blades themselves may be constructed in any suitable manner to maintain their shape and have sufficient rigidity with a minimum of weight, various recently developed techniques being adaptable. For instance, the reflective elements may be shaped by high energy forming in dies and then reinforced by a backing of honeycomb material or lattice type structure.

*Deployment mechanism*

The basic deployment mechanism is a lazy-tong type structure made in segments each having an arm 20 and an arm 22 which are crossed at their centers and pivotally joined by a connecting pin 24. Each blade 12 has fixed to one outer corner an extended lug 26 on which is rotatbly mounted a forked yoke 28, as best illustrated in FIGURES 6 and 7. Secured in the yoke 28 is a tongue 30 pivotally attached at one end by a pin 32 to swing on an axis perpendicular to the rotational axis of the yoke. The other end of a tongue 30 has a slot 34 in which one end of an arm 20 of one lazy-tong segment and one arm of an arm 22 of the next segment are held by a common pin 36 perpendicular to pin 32. This arrangement provides a universal connection of each blade 12 to one lazy-tong segment and allows for the swing action of the blade in the deploying sequence. The other end of each arm is pivotally connected by a pin 38 to the other end of the arm 22 in the next segment to complete a lazy-tong ring 40 extending around the periphery of the mirror.

The ends of each arm 20 have stop portions 42 and 44 laterally offset on opposite sides thereof, giving the arm the general form of an elongated Z. In the fully extended position the stop portions 42 and 44 of adjacent segments come together in abutting relation and limit the extension of the lazy-tong structure, the stop portions being dimensioned to so engage when the blades 12 are fully opened and forming a composite mirror. Each stop portion 42 is provided with a small bracket 46 in which is mounted a freely rotatable pulley 48, each stop portion 44 having a similar bracket carrying a pulley 50. The lazy-tong ring is actuated by flexible cables 52 interconnecting the segments in small groups for ease of operation. Each cable 52 is secured at one end to a retaining pin 54 fixed in place of the pulley in one stop portion 42. The cable is then passed under the adjacent pulley 50, along the arm 20, over the pulley 48 at the other end, under the pulley 50 of the next segment and so on for the required number of segments. As illustrated, the segments are connected in groups of three, but other arrangements can be used. The other end of each cable 52 is then continued through a guide tube 56 which extends to the inboard end of the adjacent blade 12, as in FIGURE 8, and is secured along the blade in any suitable manner. The outer end portion at least of guide tube 56 is flexible to allow for bending during the deployment cycle. The guide 56 continues through the respective hinge 14 and the cable 52 is connected to a reel unit 58 below base 10. All cables 52 are coupled in this manner for simultaneous operation by the reel unit 58, which can be of any suitable form and may be driven by a motor 60. The type of motor will depend on the power sources available, but is required to operate for only a brief period.

To ensure proper edge to edge alignment of the blades 12 in extended position, a secondary cable system is used. On one edge of each blade 12 is a fairlead bracket 62 and on the other edge is a fairlead bracket 64 incorporating a stop flange 66, which seats against the bracket 62 of the confronting edge of the adjacent blade in the open position, as in FIGURE 4. The blades are again connected in groups, a cable 68 being secured at one end to a fairlead bracket 64 then threaded through the fairlead bracket 62 of the adjacent blade. The cable 68 is continued through the mating pairs of fairlead brackets 62 and 64 for the required number of blades, then is led through a guide tube 70 which extends to the reel unit 58 in a manner similar to that illustrated in FIGURE 8. On very large mirrors additional rings of secondary cables may be added at different radial locations to ensure proper edge alignment along the full length of the blades.

*Operation*

Figure 5:
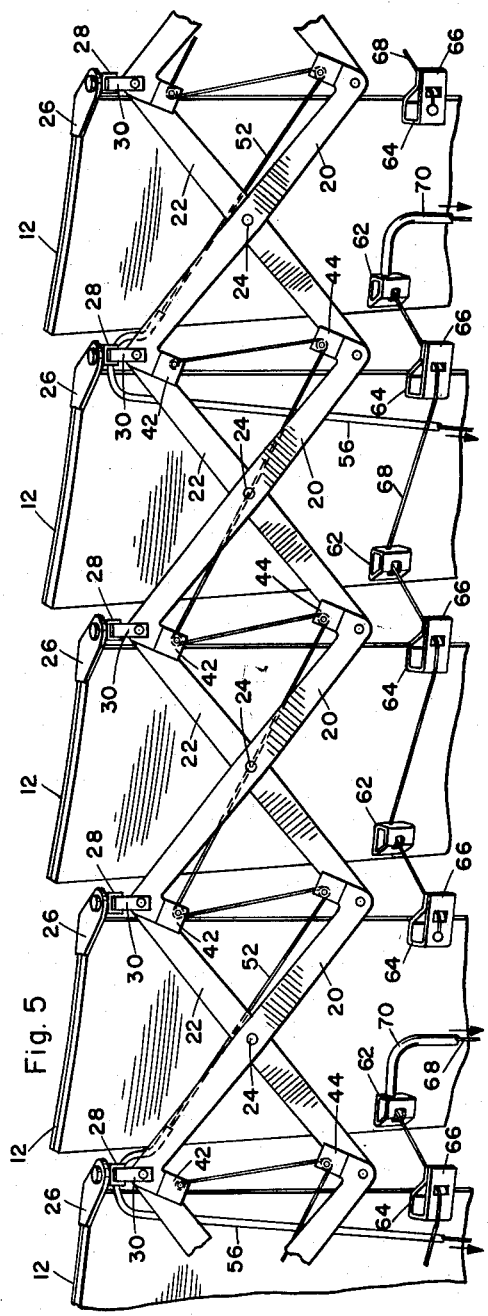
FIGURE 5 is a view similar to FIGURE 4, but with the mirror blades only partially open.

Initially the mirror is folded, as in FIGURE 3, with the lazy-tong ring 40 closed, in the position indicated fragmentarily in broken line in FIGURE 6. When the mirror is placed in its intended position by the proper means, the reel unit 58 is actuated to reel in all of the cables 52 and 68 simultaneously. Cables 52 pull the adjacent arms 20 of the lazy-tong ring together, so expanding the lazy-tong segments. This action forces the outer ends of the blades 12 apart and causes the blades to swing on their offset hinge pins 14. At the same time cables 68 are being pulled in and remain substantially taut. The near open position is illustrated in FIGURE 5, which is taken from a suitable angle to illustrate the action, rather than being a true side elevation view of the mirror.

Final tightening of cables 52 pulls the stop portions 42 and 44 together, locking the lazy-tong ring 40 in full open position and making the periphery of the mirror rigid. Simultaneously the cables 68 pull the fairlead brackets together and hold the blades 12 securely in edge to edge alignment. Thus the entire deployment of the mirror is carried out by the simple expedient of reeling in cables in one operation, which can be completed very quickly.

Since the mirror is primarily intended for deployment in space one time only, no means is indicated for collapsing the mirror automatically. However, for testing purposes it is a simple matter to collapse the lazy-tong ring manually, with the reel unit 58 released to allow the cables to unreel. The combination of the lazy-tong structure and the offset hinge pins 14 will ensure the proper return of blades 12 to their folded position.

It is understood that minor variation from the form of the invention disclosed herein may be made without departure from the spirit and scope of the invention, and that the specification and drawing are to be considered as merely illustrative rather than limiting.

I claim:

1. In combination, a foldable mirror of dish-like form having a central base element and a plurality of reflective surfaced blades hinged at their inner ends on said base element to move from a substantially parallel closed positions to generally radially extended open positions forming a dish-like mirror;

a deployable system, comprising a lazy-tong ring structure having a plurality of pivotally interconnected lazy-tong segments;

each of said segments being pivotally attached to the outer end of one of said blades;

means to expand said lazy-tong ring, thereby separating the outer ends of said blades and extending the blades to their open positions;

stop means integral with said lazy-tong ring to stop the extension thereof when said blades are fully deployed in the dish-like form;

and inter-engageable stop means on the confronting edges of said blades between the ends thereof to hold adjacent blades in edge to edge alignment.

2. In combination, a foldable mirror of dish-like form having a central base element and a plurality of reflective surfaced blades hinged at their inner ends on said base element to move from substantially parallel closed positions to generally radially extended open positions forming a dish-like mirror;

a deployment system, comprising a lazy-tong ring structure having a plurality of pivotally interconnected lazy-tong segments;

each of said segments being pivotally attached to the outer end of one of said blades;

means to expand said lazy-tong ring, thereby separating the outer ends of said blades and extending the blades to their open positions;

stop means integral with said lazy-tong ring to stop the extension thereof when said blades are fully deployed in the dish-like form;

inter-engageable stop means on the confronting edges of said blades between the ends thereof to hold adjacent blades in edge to edge alignment;

and means to draw and hold said last mentioned stop means together when said blades are fully deployed.

3. In combination, a foldable mirror of dish-like form having a central base element and a plurality of reflective surfaced blades hinged at their inner ends on said base element to move from substantially parallel closed positions to generally radially extended open positions forming a dish-like mirror;

a deployment system, comprising a lazy-tong ring structure having a plurality of interconnected segments each composed of a pair of crossed, pivotally connected arms;

each of said segments being pivotally to the outer end of one of said blades;

one of said arms of each segment having stop portions offset on opposite sides at opposite ends thereof;

means to expand said lazy-tong ring, thereby separating the outer ends of said blades and extending the blades to their open positions;

said stop portions being disposed to inter-engage with opposed stop portions of adjacent segments when said blades are fully extended.

4. In combination, a foldable mirror of dish-like form having a central base element and a plurality of reflective surfaced blades hinged at their inner ends on said base element to move from substantially parallel closed positions to generally radially extended open positions forming a dish-like mirror;

a deployment system, comprising a lazy-tong ring structure having a plurality of interconnected segments each composed of a pair of crossed, pivotally connected arms;

each of said segments being pivotally attached to the outer end of one of said blades;

one of said arms of each segment having stop portions offset on opposite sides at opposite ends thereof;

pulleys mounted on said stop portions;

cable means threaded around said pulleys between successive segments;

means to tighten said cable means, whereby said stop portions are pulled together and said lazy-tong ring is expanded, causing the outer ends of said blades to be separated and the blades to be extended to their open positions;

said stop portions being disposed to inter-engage with opposed stop portions of adjacent segments when said blades are fully extended.

5. The combination according to claim 4, wherein said cable means comprises a plurality of cables interconnecting said segments in groups;

and including a common means to tighten all of said cables simultaneously.

6. The combination according to claim 4 and including bracket elements fixed to opposite edges of said blades intermediate the ends thereof;

said bracket elements having stops inter-engageable between the bracket elements of confronting blade edges when the blades are fully extended to hold the blades in edge to edge alignment.

7. The combination according to claim 6 and including cable means interconnecting said bracket elements between blades;

and means to tighten said cable means simultaneously with the first mentioned cable means in said lazy-tong ring.

8. A composite mirror capable of deployment from a compact folded condition, said mirror comprising:

a central base;

a plurality of radial blades, the inner ends thereof having pivotal connections with said base and having reflective surfaces;

a lazy tong ring having lazy-tong arms operatively pivoted to the portions of said blades spaced from said base;

a first cable operatively connected with certain of said lazy-tong arms so that the effective tightening of said cable pulls the arms to extend the lazy-tong ring, thereby extending the outer ends of said blades;

a second cable operatively connected with said blades to turn said blades about the axes of their pivotal connections with said base, to secure proper edge alignment of the blades when said second cable is tightened; and means for effectively tightening said cables.

References Cited by the Examiner
UNITED STATES PATENTS

| | | |
|---|---|---|
| 702,146 | 6/02 | McCloud. |
| 2,806,134 | 9/57 | Tarcici _____ 88—73 X |
| 3,064,534 | 11/62 | Tumavicus _____ 88—84 |

JEWELL H. PEDERSEN, *Primary Examiner.*